Figure 1:
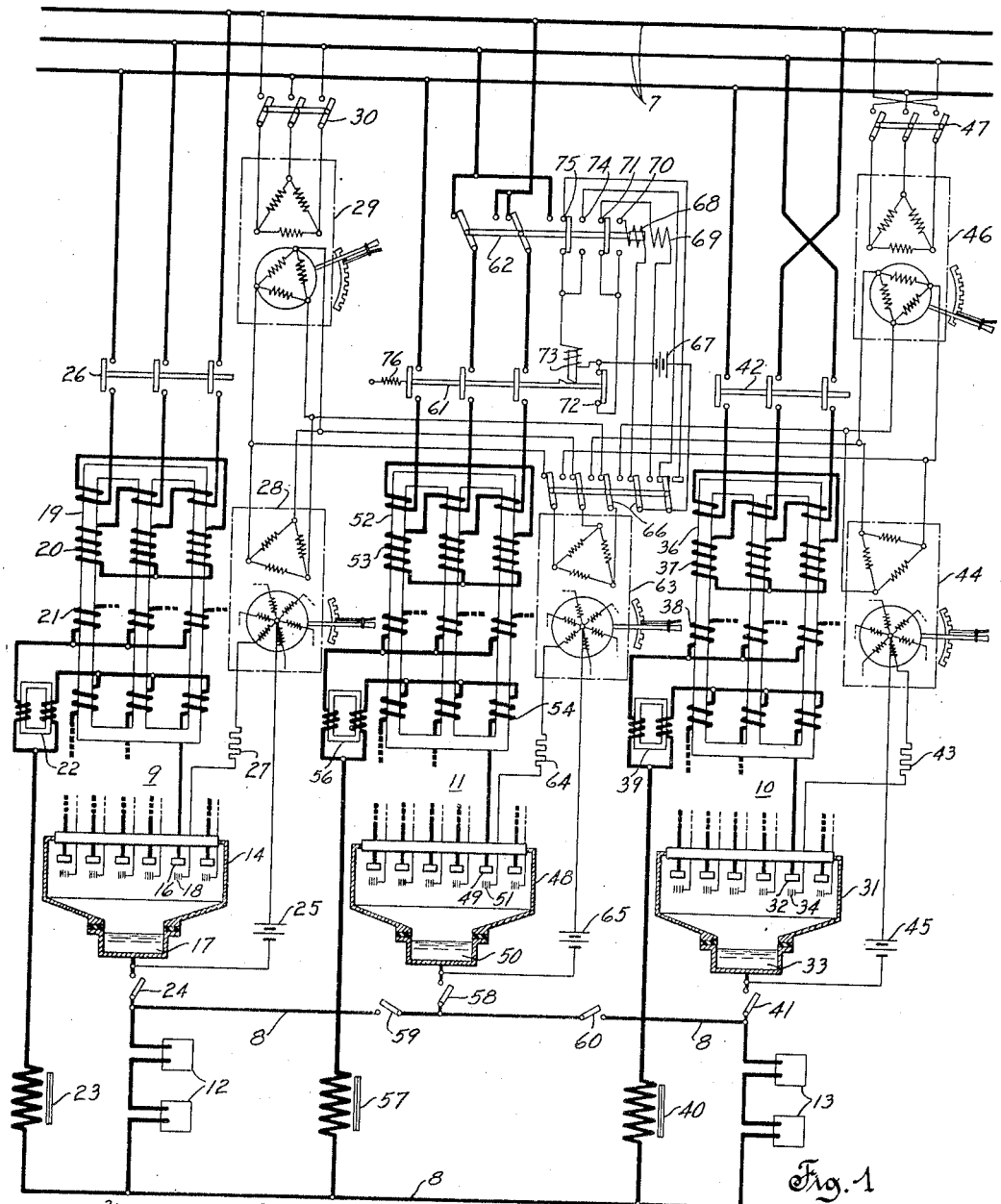

Jan. 7, 1941.   E. KERN   2,227,651
ELECTRIC VALVE CONTROL SYSTEM
Filed Oct. 19, 1939

Inventor
E. Kern
by
Attorney

Patented Jan. 7, 1941

2,227,651

UNITED STATES PATENT OFFICE 2,227,651

ELECTRIC VALVE CONTROL SYSTEM

Erwin Kern, Ennetbaden, Switzerland, assignor to Aktiengesellschaft Brown Boveri & Cie., Baden, Switzerland, a joint-stock company of Switzerland Application October 19, 1939, Serial No. 300,126

18 Claims. (Cl. 175—363)

This invention relates in general to improvements in electric valve control systems and more particularly to means for controlling the flow of current components of different frequencies in the connections of a converting system comprising a plurality of groups of valves joining an alternating current circuit with a direct current circuit.

When an electric current converting system comprising a plurality of groups of electric valves is used for transmitting current between a polyphase alternating current circuit and a direct current circuit, alternating components of different frequencies generally flow in the connections established between the circuits. As the flow of components other than the fundamental component through the alternating current circuit is generally undesired, the groups of valves are preferably so connected that the sum of components of at least some of the undesired frequencies through the different groups of valves is equal to zero. These particular components are then inherently compensated with respect to the alternating current circuit and do not appear in the current flowing therethrough. To obtain this result the groups of valves are generally arranged in several different connections comprising transformers of different designs. This arrangement is however disadvantageous for the reasons that the use of different designs increases the cost of the transformers and that a spare group cannot be provided to replace any of the normally operating groups without at least changing the internal connection thereof.

It is however also possible to cause compensation of some of the current components by utilizing groups of valves all provided with identical transformers and by connecting part of the groups with the alternating current circuit through connections changing the phase sequence of the voltages appearing in the transformer windings. A spare group may then be substituted for any one of the normally operating groups upon suitable arrangement of the connections thereof providing the required phase sequence of the voltages of the transformer associated therewith. As the control electrodes of the valves must be energized in the same sequence as the associated principal electrodes, the means for changing the phase sequences of the principal and control electrodes must be either actuated jointly or provided with suitable interlocks to prevent faulty operation of the system.

It is therefore an object of the present invention to provide a control system for a current converting system of the electric valve type by means of which a group of variably conductive valves of the system may be substituted for any one of the other groups of valves arranged in different connections.

Another object of the present invention is to provide a control system for a current converting system of the electric valve type by means of which a group of variably conductive valves may be selectively arranged in any one of a predetermined plurality of connections.

Another object of the present invention is to provide a control system for a current converting system of the electric valve type by means of which a group of valves may be connected to receive voltages forming a polyphase system with the voltages impressed on the valves of any one of other groups arranged in different connections.

Figure 2:
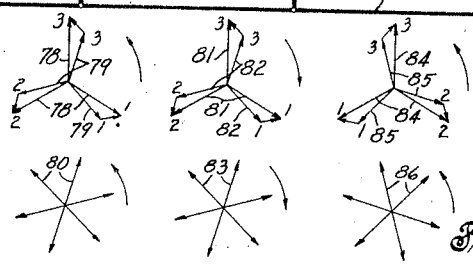

Objects and advantages other than those above set forth will be apparent from the following description when read in connection with the accompanying drawing, in which:

Fig. 1 diagrammatically illustrates one embodiment of the present invention applied to the control of a group of six valves which may be selectively connected with either one of two other groups of valves arranged in different six phase connections to form a twelve phase system; and Fig. 2 is a diagram of the voltages appearing in the windings of the main transformers associated with the different groups of valves of the system illustrated in Fig. 1.

Referring more particularly to the drawing by characters of reference, reference numeral 7 designates a polyphase alternating current circuit to be interconnected with a direct current circuit 8 for the flow of current therebetween through a converting system comprising a plurality of parallel converters of the electric valve type generally designated by 9, 10, 11. It may be assumed, for example, that circuit 7 is a supply circuit connected with a suitable current generator (not shown) and that circuit 8 is an output circuit supplying current to a suitable load such as banks of serially connected electrolytic cells 12, 13. It will be understood however that the system is also operable for the transmission of energy in the reverse direction from circuit 8 to circuit 7.

Converters 9, 10, 11 are preferably substantially identical in their principal characteristics and made of identical combinations of elements. Converter 9, for example, comprises a group of six electric valves generally designated by 14 which are severally provided with principal electrodes and with suitable means preferably comprising control electrodes for controlling the conductivity of the valves. The principal electrodes comprise anodes 16 preferably arranged within a common casing and a cathode 17 common to all the valves. Suitable means (not shown) are provided for bringing cathode 17 into electron emitting condition and for maintaining the cathode in such condition as is well known. Anodes 16 are severally associated with control electrodes 18 which are preferably of the electrostatic type known as grids.

The electrodes of valves 14 are connected with circuit 7 through means comprising a phase shifting main transformer 19 having a three phase primary winding 20 connected with circuit 7 and a secondary winding 21. Winding 20 comprises a plurality of major and minor phase portions connected in zigzag connection and so arranged as to cause the voltages induced in winding 21 to be displaced by fifteen electrical degrees with respect to the voltages of circuit 7. Winding 21 is divided into a plurality of phase portions severally connected with anodes 16 and arranged in two groups to provide two neutral points severally connected with the negative conductor of circuit 8 through an interphase transformer 22. The connections of winding 21 with valves 14 through circuit 8 may further comprise a current smoothing reactor 23 and a switch 24. Although winding 21 is herein assumed to be of the six phase type it will be understood that the phase portions thereof may be in any number multiple of three as is well known.

Transformer 19 and a switch 26 connecting anodes 16 with circuit 7 are arranged in a connection which will be referred to as the first connection for the sake of convenience. This connection is such as to cause impression of voltages from the phase conductors of circuit 7 on the phase portions of winding 20 in a predetermined sequence which may be considered as being the so-called positive phase sequence. Control electrodes 18 are severally connected with circuit 7 through current limiting resistors 27, the phase portions of two serially connected transformers 28, 29, and a switch 30. Transformers 28, 29 are preferably of the phase adjustable type known as phase shifters and supply control electrodes 18 with polyphase alternating potential components from circuit 7 impressed thereon in the same phase sequence as the voltages impressed on the corresponding anodes through transformer 19. A common negative unidirectional potential component is preferably impressed on control electrodes 18 by means of a battery 25.

Converter 10 comprises a group of valves 31 provided with anodes 32, a cathode 33, and control electrodes 34. The electrodes of valves 31 are connected with circuit 7 through means arranged in a connection differing from the connection of the electrodes of valves 14 and which will be referred to as the second connection. The second connection comprises a main transformer 36 substantially identical to transformer 19 and provided with a primary winding 37 and a secondary winding 38. The phase portions of winding 38 are connected with circuit 8 through an interphase transformer 39 and a reactor 40. Cathode 33 is connected with the positive conductor of circuit 8 through a switch 41. Winding 37 is connected with circuit 7 through a switch 42 and through connections differing from the connections of winding 20 by the crossing of two conductors as indicated on the drawing. This arrangement causes impression of voltages from circuit 7 on the phase portions of winding 37 in a phase sequence differing from the phase sequence of the voltages of winding 20. Under the assumption made relative to the latter and inasmuch as three phase windings such as windings 20 and 37 are operable only with two different phase sequences, the phase sequence of winding 37 will necessarily be the so-called negative phase sequence. Potential components of negative phase sequence are likewise impressed from circuit 7 of control electrodes 34 through current limiting resistors 43, two phase shifters 44, 46 and a switch 47. A battery 45 supplies a common negative potential component to control electrodes 34.

It will be understood that additional converters (not shown) may be connected permanently in parallel with converters 9 and 10, such additional converters preferably comprising a number of converters connected in the same manner as converter 9 and an equal number connected in the same manner as converter 10.

Converter 11 may be considered as being a spare unit and is therefore assumed to be normally disconnected from circuits 7 and 8. Converter 11 comprises a group of valves 48 provided with anodes 49, a cathode 50 and control electrodes 51. Anodes 49 are connected with the phase portions of the secondary winding 54 of a main transformer 52 having a primary winding 53. Winding 54 is preferably connected with circuit 8 through an interphase transformer 56 and a reactor 57. Cathode 50 may be connected with circuit 8 through a switch 58. Converter 11 may also be selectively connected in parallel with converters 9 and 10 by means of further switches 59, 60. Winding 53 may be selectively connected with circuit 7 in the first connection of winding 20 and in the second connection of winding 37 by means of a switch 61 and a reversing switch 62. Switch 62 is of the double throw type operable to cross two of the conductors joining circuit 7 with winding 53 to change the phase sequence of the voltages impressed from circuit 7 on valves 48, thereby also changing the connections of some of valves 48 from one phase to another phase of circuit 7. The conductivity of valves 48 may be controlled by means of control electrodes 51 energized from a battery 65 and from a phase shifter 63 through current limiting resistors 64.

Phase shifter 63 may be selectively energized from phase shifters 29 and 46 through a double throw switch 66. Switch 66 also controls the operation of switches 61, 62 and thus serves as an interlock between the conductivity controlling means of valves 48 and switch 62 to cause joint reversal of the phase sequences of the voltages impressed from circuit 7 on valves 48 and of the potentials of control electrodes 51. For this purpose switch 66 controls the connection of a suitable source of current such as a battery 67 with the oppositely operating actuating coils 68, 69 of switch 62 through auxiliary contacts 70, 71 of switch 62 and auxiliary contacts 72 of switch 61. Switch 66 also controls the connection of battery 67 with trip coil 73 of switch 61 through contacts 74, 75 of switch 62. Switch 61 is urged towards the open position thereof by means of a spring 76.

In operation, the system being connected as shown and circuit 7 being energized, converter 9 may be placed in operation by rendering cathode 17 conductive and closing switches 26, 24 and 30. The voltages then impressed from circuit 7 on winding 20 may be represented by a three phase system of vectors 78 of Fig. 2 having the phase sequence indicated by the numerals 1, 2, 3. The corresponding direction of rotation of vectors 78 is counterclockwise as indicated by the adjacent arrow showing that vectors 78 are in the conventional positive phase sequence. The voltages appearing in the major portions of winding 20 are then represented by vectors 79 angularly displaced with respect to vectors 78 by fifteen electrical degrees. It will be observed that each major portion of winding 20 is serially connected in opposition with a minor portion receiving a voltage lagging that of the major portion by 120 degrees. When vectors 79 are drawn in accordance therewith it becomes apparent that vectors 79 are lagging vectors 78. The numerals 1, 2, 3 applied to the three vectors 79 indicate the three voltages represented by these vectors appear respectively in the first, second and third major phase portions of winding 20 taken in the order of their arrangement from left to right in Fig. 1. The voltages induced in winding 21 are either in phase coincidence or in phase opposition with the voltages of winding 20 and may be represented by a six phase system of vectors 80 having a positive phase sequence.

Phase shifters 28, 29 are so connected that the potentials impressed on control electrodes 18 likewise form a six phase system having a positive phase sequence. The potentials of each anode 16 and of the associated control electrode 18 are then in a uniform phase relation and current may flow in regular sequence from each of the phase portions of winding 21 through the different anodes 16. Each anode may carry current when it is at a higher positive potential than the remaining anodes, and such flow of current is initiated upon passage of the associated control electrode from a negative potential to a positive potential with respect to the cathode potential as is well known. The different anode current impulses combine at cathode 17 into a direct current flowing through switch 24, cells 12, reactor 23 and interphase transformer 22 back to winding 21.

Each of the anode currents is a substantially rectangular pulsating current which may be considered as comprising a plurality of components including a fundamental alternating component of the frequency of the voltage of circuit 7. The fundamental component of the different anode currents form a six phase system and may be represented by vectors (not shown) similar to vectors 80 but lagging behind them by an angle depending on the adjustment of phase shifters 29 and 28. When converter 9 is operating alone phase shifter 28 is preferably adjusted to be without effect on the phase of the potentials of control electrodes 18. The phase of the control electrode potentials may be varied by means of phase shifter 29 to vary the output voltage of converter 9 and thereby regulate the flow of current through cells 12.

Converter 10 may be placed in operation in the manner outlined above with respect to converter 9 and current may be supplied therefrom to cells 13 upon closure of switches 41, 42 and 47. The voltages impressed from circuit 7 on the terminals of winding 37 may be represented by vectors 81 identical to vectors 78. The phase sequence in which the voltages are impressed on phases 1, 2 and 3 of winding 37 is however the sequence 2, 1, 3 by reason of the crossing of the connections between circuit 7 and winding 37. Vectors 81 accordingly constitute a system having a negative phase sequence and their direction of rotation is clockwise as indicated by the adjacent arrow in Fig. 2. The voltages of the major portions of winding 37 are represented by a set of vectors 82 identical to vectors 79 but of negative phase sequence. The voltages of the phase portions of winding 38 are represented by a six phase system of vectors 83 identical to vectors 80 but of negative phase sequence.

Although vectors 80 and 83 are parallel in pairs the vectors of each pair are not in phase with each other because they are not distant from the implied vertical reference axis (not shown) by equal angles in their respective directions of rotation. The relationship between vectors 80 and 83 will appear more clearly from a consideration of vectors 79 and 82. While the latter vectors are also parallel in pairs vectors 79 lag behind vectors 78 by fifteen degrees and vectors 82 lead vectors 81 by fifteen degrees because of the reversal of the direction of rotation thereof. While the voltages of transformer 36 are thus conventionally represented by vectors 81, 82, 83 numbered in the direction of positive sequence but rotating in the direction of negative sequence, these voltages may also be represented by three systems of vectors 84, 85, 86 numbered in the direction of negative sequence but rotating in the direction of positive sequence shown by the adjacent arrows. Vectors 79 and 85 rotating in the same direction, it becomes apparent that each vector 79 lags behind one of vectors 85 by thirty electrical degrees. Vectors 86 also rotate in the same direction as vectors 80 and are displaced with respect thereto by thirty electrical degrees. Vectors 80 and 86 therefore jointly form a twelve phase system of vectors. The voltages impressed on valves 14 and 31 by transformers 19 and 36 accordingly form a twelve phase system of voltages although transformers 19 and 36 are six phase transformers substantially identical in their construction and in their internal connections.

To derive the greatest possible advantage from the above described system, valves 14 and 31 are preferably arranged to supply current to two identical banks of cells 12 and 13. If phase shifters 29 and 46 are so adjusted as to impress on control electrodes 18 and 34 respectively potentials in the same phase relation with the voltages of windings 21 and 38, valves 14 and 31 will deliver substantially equal currents under substantially equal voltages. The fundamental components of the currents flowing through valves 31 then cooperate with the fundamental components of the currents flowing through valves 14 to form a twelve phase system of components. The joint current flowing from circuit 7 to transformers 19 and 36 therefore presents the same reduced amount of harmonic components as if valves 14 and 31 were connected with circuit 7 through a common twelve phase transformer. As cells 12 and 13 are supplied with current under average voltages of the same value, switches 59 and 60 may be closed if desired but it is generally preferred to leave such switches open to avoid the flow of alternating circulating current components between converters 9 and 10.

If it is desired to connect converter 11 in parallel with converter 9, cathode 50 may be rendered conductive and switches 58, 59 and 61 may be closed. Converter 11 is then connected in the first connection above described and accordingly functions in the manner above set forth with respect to converter 9. The flow of current through cells 12 is divided between valves 14 and 15

48 and may be regulated by means of phase shifter 29. The distribution of current between valves 14 and 48 may be adjusted in any desired manner by means of phase shifters 28 and 63. Even if equal currents are desired to be transmitted through converters 9 and 11 some adjustment thereof by means of phase shifters 28 and 63 will generally be necessary to compensate the unavoidable minor differences in the characteristics of transformers 19 and 52. Converter 9 may then be disconnected from circuits 7 and 8 for inspection, repairs or any other purpose while converter 11 continues alone to supply current to cells 12. Switch 60 may also be closed to cause converters 10 and 11 to jointly supply current to cells 12 and 13.

If converter 9 is reconnected with circuits 7 and 8, converter 11 may be disconnected from converter 9 and connected instead in parallel with converter 10. For this purpose switch 66 is moved to the right. The switch first disconnects phase shifter 63 from shifter 29, thereby leaving control electrodes 51 energized only from battery 65. The control electrodes are maintained at a negative potential by the battery and prevent further flow of current through valves 48. Switch 66 thereafter connects trip coil 73 with battery 67 through contacts 75. The trip coil releases switch 61, which is opened by spring 76. Switch 66 finally connects phase shifter 63 with phase shifter 46 and connects coil 69 of switch 62 with battery 67 through contacts 71 and 72. Coil 69 moves switch 62 to the right to connect transformer 52 in the same manner as transformer 36, thereby reversing the phase sequence of the voltages appearing in the windings of transformer 52 and changing the direction of shift thereof from lagging to leading with respect to the voltages of circuit 7. Switch 59 is then opened, switch 60 is closed, and switch 61 may then immediately be reclosed either manually or by any suitable known automatic means (not shown) to place converter 11 in parallel with converter 10.

The magnitude of the flow of current through cells 13 may be regulated by means of phase shifter 46 and the distribution of current between valves 31 and 48 may be adjusted by means of phase shifters 44 and 63. Converter 10 may then be disconnected from circuits 7 and 8 by opening switches 42, 41 and 47 so as to substitute converter 11 therefor. Converter 11 then cooperates with converter 9 to form a system equivalent to a twelve phase system. The connections of phase shifters 29 and 46 with phase shifter 63 are interlocked with switch 62 through switch 66 in such manner that the voltages of transformer 52 and of phase shifter 63 are in the correct relative phase sequence and have the correct relative phase displacement for either position of switch 66.

Valves 48 may thus selectively be substituted for valves 14 and for valves 31 by selectively disconnecting valves 14 and valves 31 from circuit 7 and selectively connecting valves 48 with circuit 7 in the first or second connection above defined by means of switch 62. If the voltages of phase shifters 29 and 46 were originally in the same phase relation with respect to the voltages of transformers 19 and 36, reversal of switch 66 causes joint reversal of the phase sequences of the voltages impressed on valves 48 from circuit 7 and of the potentials impressed on control electrodes 51 while maintaining the existing phase relation between the valve voltages and the control electrode potentials. As a result of such control of the operation of transformer 52 and of phase shifter 63, the output voltage of converter 11 is adjusted at substantially equal values immediately before and immediately after operation of switches 66 and 62.

Although but one embodiment of the present invention has been illustrated and described, it will be apparent to those skilled in the art that various modifications and changes may be made therein without departing from the spirit of the invention or from the scope of the appended claims.

It is claimed and desired to secure by Letters Patent:

1. In an electric current converting system, a polyphase alternating current circuit, a direct current circuit, means comprising an electric valve interconnecting said circuits for the flow of current therebetween, means for controlling the conductivity of said valve, means for changing the connection of said valve from one phase to another phase of said alternating current circuit, and means interlocking said conductivity controlling means with said connection changing means.

2. In an electric current converting system, a polyphase alternating current circuit, a direct current circuit, means comprising a plurality of electric valves interconnecting said circuits for the flow of current therebetween, means for controlling the conductivity of said valves, means for changing the phase sequence of the voltages impressed from said alternating current circuit on said valves, and means interlocking said conductivity controlling means with said phase sequence changing means.

3. In an electric current converting system, a polyphase alternating current circuit, a direct current circuit, means comprising a phase shifting transformer and a plurality of electric valves interconnecting said circuits for the flow of current therebetween, means for controlling the conductivity of said valves, means for changing the direction of shift of said transformer, and an interlock between said conductivity controlling means and said shift direction changing means.

4. In an electric current converting system, a polyphase alternating current circuit, a direct current circuit, means comprising a plurality of electric valves interconnecting said circuits for the flow of current therebetween, means for controlling the conductivity of said valves comprising control electrodes of said valves and means for impressing polyphase alternating potentials from said alternating current circuit on said control electrodes, and means for causing joint reversal of the phase sequences of the voltages impressed from said alternating current circuit on said valves and of the said potentials.

5. In an electric current converting system, a polyphase alternating current circuit, a direct current circuit, means comprising a plurality of electric valves interconnecting said circuits for the flow of current therebetween, means for controlling the conductivity of said valves comprising control electrodes of said valves and means for impressing polyphase alternating potentials from said alternating current circuit on said control electrodes, means for changing the phase sequence of the voltages impressed from said alternating current circuit on said valves, means for changing the phase sequence of said potentials, and means interlocking the first and second said phase sequence changing means.

6. In an electric current converting system, a polyphase alternating current circuit, a direct current circuit, means comprising a plurality of electric valves interconnecting said circuits for the flow of current therebetween, means for controlling the conductivity of said valves, means for changing the phase sequence of the voltages impressed from said alternating current circuit on said valves, and means interlocking said conductivity controlling means with said phase sequence changing means for controlling the operation of each thereof in such sense as to adjust the output voltage of said system at substantially equal values immediately before and immediately after operation of said phase sequence changing means.

7. In an electric current converting system, a polyphase alternating current circuit, a direct current circuit, means comprising a plurality of electric valves interconnecting said circuits for the flow of current therebetween, means for controlling the conductivity of said valves comprising control electrodes of said valves and means for impressing polyphase alternating potentials from said alternating current circuit on said control electrodes, and means for causing joint reversal of the phase sequences of the voltages impressed from said alternating current circuit on said valves and of the said potentials while maintaining the existing phase relations between said voltages and said potentials.

8. An electric current converting system comprising a polyphase alternating current circuit, a plurality of electric valves, means for connecting a first group of said valves with said circuit in a first connection, means for connecting a second group of said valves with said circuit in a second connection, means for selectively connecting a third group of said valves with said circuit in said first and second connections, means for controlling the conductivity of said third group, and means interlocking said conductivity controlling means with said selective connecting means.

9. An electric current converting system comprising a polyphase alternating current circuit, a plurality of electric valves, means for connecting a first group of said valves with said circuit in a first connection, means for connecting a second group of said valves with said circuit in a second connection, means for selectively substituting a third group of said valves for the said first and the said second groups comprising means for selectively disconnecting said first and second groups from said circuit, means for selectively connecting said third group with said circuit in said first and second connections, means for controlling the conductivity of said third group, and means interlocking said conductivity controlling means with said selective connecting means.

10. An electric current converting system comprising a polyphase alternating current circuit, a plurality of electric valves each comprising principal and control electrodes, means for connecting said electrodes of a first group of said valves with said circuit in a first connection, means for connecting said electrodes of a second group of said valves with said circuit in a second connection, and means for selectively connecting said electrodes of a third group of said valves with said circuit in the said first and second connections.

11. An electric current converting system comprising a polyphase alternating current circuit, a plurality of electric valves each comprising principal and control electrodes, means for connecting said electrodes of a first group of said valves with said circuit in a first connection to supply the valves of the said first group with currents having fundamental components forming a polyphase system of a predetermined number of phases, means for connecting said electrodes of a second group of said valves with said circuit in a second connection to supply the valves of the said second group with currents having fundamental components forming with the first said components a polyphase system of a number of phases greater than the first said number of phases, and means for selectively connecting said electrodes of a third group of said valves with said circuit in the said first and second connections.

12. An electric current converting system comprising a polyphase alternating current circuit, a plurality of electric valves each comprising principal and control electrodes, a plurality of substantially identical transformers, means comprising a first one of said transformers for connecting said electrodes of a first group of said valves with said circuit in a first connection to supply the valves of said first group with currents having fundamental components forming a polyphase system of a predetermined number of phases, means comprising a second one of said transformers for connecting said electrodes of a second group of said valves with said circuit in a second connection to supply the valves of said second group with currents having fundamental components forming with the first said components a polyphase system of a number of phases greater than the first said number of phases, and means comprising a third one of said transformers for selectively connecting said electrodes of a third group of said valves with said circuit in the said first and second connections.

13. An electric current converting system comprising a polyphase alternating current circuit, a plurality of electric valves each comprising principal and control electrodes, a plurality of substantially identical transformers, means comprising a first one of said transformers for connecting said electrodes of a first group of said valves with said circuit in a first connection impressing voltages from said circuit on the windings of said first transformer in a predetermined phase sequence to supply the valves of said first group with currents having fundamental components forming a polyphase system of a predetermined number of phases, means comprising a second one of said transformers for connecting said electrodes of a second group of said valves with said circuit in a second connection impressing voltages from said circuit on the windings of said second transformer in a phase sequence differing from the first said phase sequence to supply the valves of said second group with currents having fundamental components forming with the first said components a polyphase system of a number of phases greater than the first said number of phases, and means comprising a third one of said transformers for selectively connecting said electrodes of a third group of said valves with said circuit in the said first and second connections.

14. An electric current converting system comprising a polyphase alternating current circuit, a plurality of electric valves each comprising principal and control electrodes, a plurality of substantially identical main transformers, a plurality of control transformers, means comprising a first one of said main transformers and a first one of said control transformers for connecting said electodes of a first group of said valves with said circuit in a first connection impressing voltages from said circuit on the windings of said first transformers in a predetermined phase sequence to supply the valves of said first group with currents having fundamental components forming a polyphase system of a predetermined number of phases, means comprising a second one of said main transformers and a second one of said control transformers for connecting said electrodes of a second group of said valves with said circuit in a second connection impressing voltages from said circuit on the windings of said second transformers in a phase sequence different from the first said phase sequence to supply the valves of said second group with currents having fundamental components forming with the first said components a polyphase system having a number of phases greater than the first said number of phases, and means comprising a third one of said main transformers and a third one of said control transformers for selectively connecting said electrodes of a third group of said valves with said circuit in the said first and second connections.

15. In an electric current converting system, a polyphase alternating current circuit, a direct current circuit, means interconnecting said circuits for the flow of current therebetween comprising a plurality of electric valves and means for impressing voltages from said alternating current circuit on said valves in a predetermined sequence, means for controlling the conductivity of said valves, means for changing the sequence of said voltages from said predetermined sequence to another predetermined sequence, and means interlocking said conductivity controlling means with said phase sequence changing means.

16. In an electric current converting system, a polyphase alternating current circuit, a direct current circuit, means interconnecting said circuits for the flow of current therebetween comprising a plurality of electric valves and a transformer, said transformer comprising windings for imparting a predetermined phase shift to the transformer secondary terminal voltages relative to the transformer primary terminal voltages, means for controlling the conductivity of said valves, means for causing reversal of the direction of said phase shift, and an interlock between said conductivity controlling means and said phase shift direction reversing means.

17. In an electric current converting system, a polyphase alternating current circuit, a direct current circuit, means interconnecting said circuits for the flow of current therebetween comprising a plurality of electric valves provided with control electrodes and means for impressing voltages of a predetermined phase sequence from said alternating current circuit on said valves and for impressing potentials of said phase sequence from said alternating current circuit on said electrodes, and means for changing the phase sequence of said voltages and of said potentials from said predetermined phase sequence to a phase sequence reverse of said predetermined phase sequence.

18. In an electric current converting system, a polyphase alternating current circuit, a direct current circuit, means interconnecting said circuits for the flow of current therebetween comprising a plurality of electric valves provided with control electrodes and means for impressing voltages of a first predetermined phase sequence from said alternating current circuit on said valves and for impressing potentials of said phase sequence from said alternating current circuit on said electrodes, means for changing the phase sequence of said voltages from said predetermined phase sequence to a second predetermined phase sequence, means for changing the phase sequence of said potentials from said first predetermined phase sequence to said second predetermined phase sequence, and means interlocking the first and second said phase sequence changing means.

ERWIN KERN.